United States Patent
Sonoda et al.

(10) Patent No.: US 6,841,756 B2
(45) Date of Patent: Jan. 11, 2005

(54) LASER WELDING EQUIPMENT

(75) Inventors: Hirobumi Sonoda, Narashino (JP); Kenji Okuyama, Narashino (JP); Junichi Ibukuro, Narashino (JP); Takanori Yahaba, Wako (JP); Masato Takikawa, Wako (JP); Yasutomo Ichiyama, Futtsu (JP); Toshiyasu Ukena, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 2 days.

(21) Appl. No.: 10/412,688

(22) Filed: Apr. 14, 2003

(65) Prior Publication Data

US 2004/0104204 A1 Jun. 3, 2004

(30) Foreign Application Priority Data

Apr. 15, 2002 (JP) ........................................ 2002-111731

(51) Int. Cl.$^7$ .............................................. B23K 26/20
(52) U.S. Cl. .................................. 219/121.63; 228/44.3
(58) Field of Search .......................... 219/121.6, 121.63, 219/121.64, 121.78, 121.82, 121.83; 228/190, 212, 44.3

(56) References Cited

U.S. PATENT DOCUMENTS 5,478,983 A * 12/1995 Rancourt ................ 219/121.63

FOREIGN PATENT DOCUMENTS

JP 57149083 A * 9/1982

* cited by examiner

*Primary Examiner*—Samuel M. Heinrich

(57) ABSTRACT

A laser welding device for executing stable, highly reliable edge joint welding by laser beam comprises: a laser beam emitting head directed to a layered bonding position on an end surface in an edge of a layered base material; a first set of rollers for being along one plane of the base material; a second set of rollers for being along the other plane opposing the plane; a first member which rotatably supports the rollers and which is coupled with the head; a second member which rotatably supports the rollers and which is coupled with the head; and a pressing means for driving at least one of the first and second members and in a direction in which the gap between the rollers and the rollers is reduced in order to sandwich and press the base material by means of the rollers.

6 Claims, 2 Drawing Sheets

LASER WELDING EQUIPMENT

BACKGROUND OF THE INVENTION

1. Field of the Invention

The present invention relates to an edge joint welding device in which, to a bonding position on an end surface portion in an edge of a layered base material, a laser beam is emitted from a laser beam emitting head that faces the end surface.

2. Description of the Related Art

YAG laser welding has characteristics described below and has been widely employed in automatic welding, such as for automobiles.

(1) Convergent laser light can be produced and low distortion and high speed welding are possible.

(2) Since the laser light absorption factor thereof in a metal material is several times that of a $CO_2$ laser beam, high efficiency welding is possible. Furthermore, since the wavelength is one-tenth that of a $CO_2$ laser beam, it is not significantly influenced by plasma generated during welding.

(3) Since laser light can be transmitted by means of a flexible optical fiber, manipulation is easy and a multi-jointed robot can be utilized. Furthermore, it can be transmitted to a place up to about 100 m distant therefrom.

(4) Since in laser light, time sharing and power sharing are possible, by using it at a plurality of work stations, a high utilization efficiency can be obtained.

However, in YAG laser welding, although a laser beam is focused to increase energy density, thereby executing welding, since the focused light spot diameter is 0.3 to 1 mm, which is very small, in edge joint welding in which, to a bonding position on an end surface portion in an edge of a layered base material, a laser beam is emitted from a laser beam emitting head which faces the end surface, when uniting of the end surface portion is insufficient, that is, when there is a gap, since the laser beam passes through the end surface portion, the end surface cannot be welded. Laser beam emission positional divergence with respect to a bonding line of the layered base material is likely to occur. Thus, stable, highly reliable edge joint welding is difficult.

SUMMARY OF THE INVENTION

It is an object of the present invention to produce stable, highly reliable edge joint welding by using a laser beam.

The laser welding device according to the invention is characterized by comprising: a laser beam emitting head (9) directed to a layered bonding position on an end surface in an edge of a layered base material (21); a first set of rollers (12) for being along one plane of the layered base material (21); a second set of rollers (18) for being along the other plane opposing the plane; a first member (11) rotatably supporting the first set of rollers (12) and being coupled with the laser beam emitting head (9); a second member (17) rotatably supporting the second set of rollers (18) and being coupled with the laser beam emitting head (9); and a pressing means (16) for driving at least one of the first and second members (11, 17) in a direction in which the gap between the first set of rollers (12) and the second set of rollers (18) is reduced in order to sandwich and press the layered base material (21) by means of the first set of rollers (12) and the second set of rollers (18).

To facilitate understanding, reference numerals shown in the accompanying drawings that denote corresponding or equivalent components in the embodiment described later are appended in parenthesis for reference. The following are described similarly thereto.

In the device, the first and second sets of rollers (12, 18), being pushed and driven by the pressing means (16), sandwich and press the layered base material (21). This enables the end surface portion in the edge of the layered base material to be closely bonded, whereby the end surface can be welded reliably.

In a preferred embodiment, the laser welding device according to the invention further comprises a skirting means (1 to 9, 11, 12) for maintaining the distance between a laser beam emitting nozzle of the laser beam emitting head (9) and the end surface in the edge of the layered base material (21) at a constant value. This enables a laser focus position (depth) with respect to the end surface in the edge of the layered base material (21) to be maintained at one point, whereby weld quality of the end surface becomes stable, resulting in highly reliable edge joint laser welding.

Furthermore, in a preferred embodiment of the laser welding device according to the invention, the skirting means (1 to 9, 11, 12) comprises a roller (12) for being along the end surface in the edge of the layered base material (21) and a skirting drive means (6) for rotatably supporting the roller (12) and driving a member (11) coupled with the laser beam emitting head (9) and the laser beam emitting head (9) or a member coupled therewith in a direction in which the laser beam emitting nozzle of the laser beam emitting head (9) approaches the end surface of the edge. This enables the laser beam emitting head (9) or a member (for example, a coupling member 11) coupled therewith to be driven by a relatively simple drive means such as an air cylinder, a coil spring, and the like so that the roller (12) is pressed against the end surface. The skirting means may comprise a mechanism for reciprocatably driving the laser beam emitting head, employing an electrical motor as a power source, a distance sensor for detecting the distance between the laser emitting head and the end surface of the layered base material, and a servo circuit for driving an electrical motor forward and reverse so that the detected distance coincides with a preset value. However, rather than a laser welding device with this structural feature, a laser welding device with the structural features of the present embodiment can be inexpensively manufactured, and the maintenance thereof is easier.

In a preferred embodiment of the laser welding device according to the invention, the roller (12) for being along the end surface of the edge is the first set of rollers (12). The first set of rollers (12) has a circumferential surface abutting one plane of the layered base material (21). In this embodiment, the first set of rollers (12) has a flange on one end of the circumferential surface, and this flange abuts the end surface of the edge of the layered base material (21) so that the first set of rollers (12) are along the end surface of the edge of the layered base material (21). Therefore, since the position (depth) of the laser focus for the end surface of the edge of the layered base material (21) can be maintained at one point, weld quality of the end surface is stable, and the edge joint laser welding is highly reliable.

Moreover, in a preferred embodiment, the laser welding device according to the invention further comprises a mechanism (7) for adjusting the position of the first member (11) with respect to the laser beam emitting head (9) in a direction of the thickness of the layered base material (21), wherein the second member (17) is movable in the thickness direction of the layered base material (21) with respect to the laser beam emitting head (9), and the pressing means (16) drives the second member (17) in the thickness direction. When the thickness of a plate material (21a) of the layered base material (21) against which the first set of rollers (12) abuts changes, by changing the position (in the x direction) of the first member (11) in conformity with the thickness change by means of an adjustment mechanism (7), the laser emitting position can match the bonding line of the layered base material (21). This structural feature can be applied to the layered base material (21) having various thicknesses.

The laser welding device according to the invention is characterized by comprising: a head holder (4) movably supported in a z direction with respect to a base holder (1, 2); a laser beam emitting head (9) fixed on the head holder (4) to emit a laser beam in the z direction; a first set of rollers (12) having a circumferential surface opposing an outer surface of a layered base material (21) positioned below a laser beam emitting nozzle of the laser beam emitting head (9) and a flange opposing an end surface in an edge of the layered base material (21), the outer surface being parallel to the z direction; a second set of rollers (18) having a circumferential surface opposing the other outer surface opposing the outer surface; a first member (11) rotatably supporting the first set of rollers (12); an adjustment mechanism (7) coupling the first member (11) with the laser beam emitting head (9) so that a position in a direction of the thickness of the layered base material (21) is adjustable; a second member (17) rotatably supporting the second set of rollers (18); a guiding mechanism (13 to 15) supporting the second member (17) on the laser beam emitting head (9) so that the second member (17) is reciprocatably supported in the thickness direction of the layered base material (21); a pressing means (16) for driving the second member (17) in a direction in which the circumferential surface of the second set of rollers (18) approaches the circumferential surface of the first set of rollers (12); and a means (6) for driving the head holder (4) along the z direction with respect to the base holder (1, 2) so that the flange of the first set of rollers (12) is along the end surface of the edge of the layered base material (21).

This enables interactions and effects similar to those of the present invention to be produced.

Other objects and advantages of the invention will be apparent from the detailed description of the preferred embodiment with reference to the accompanying drawings.

BEST MODE FOR CARRYING OUT THE INVENTION

Figure 1:
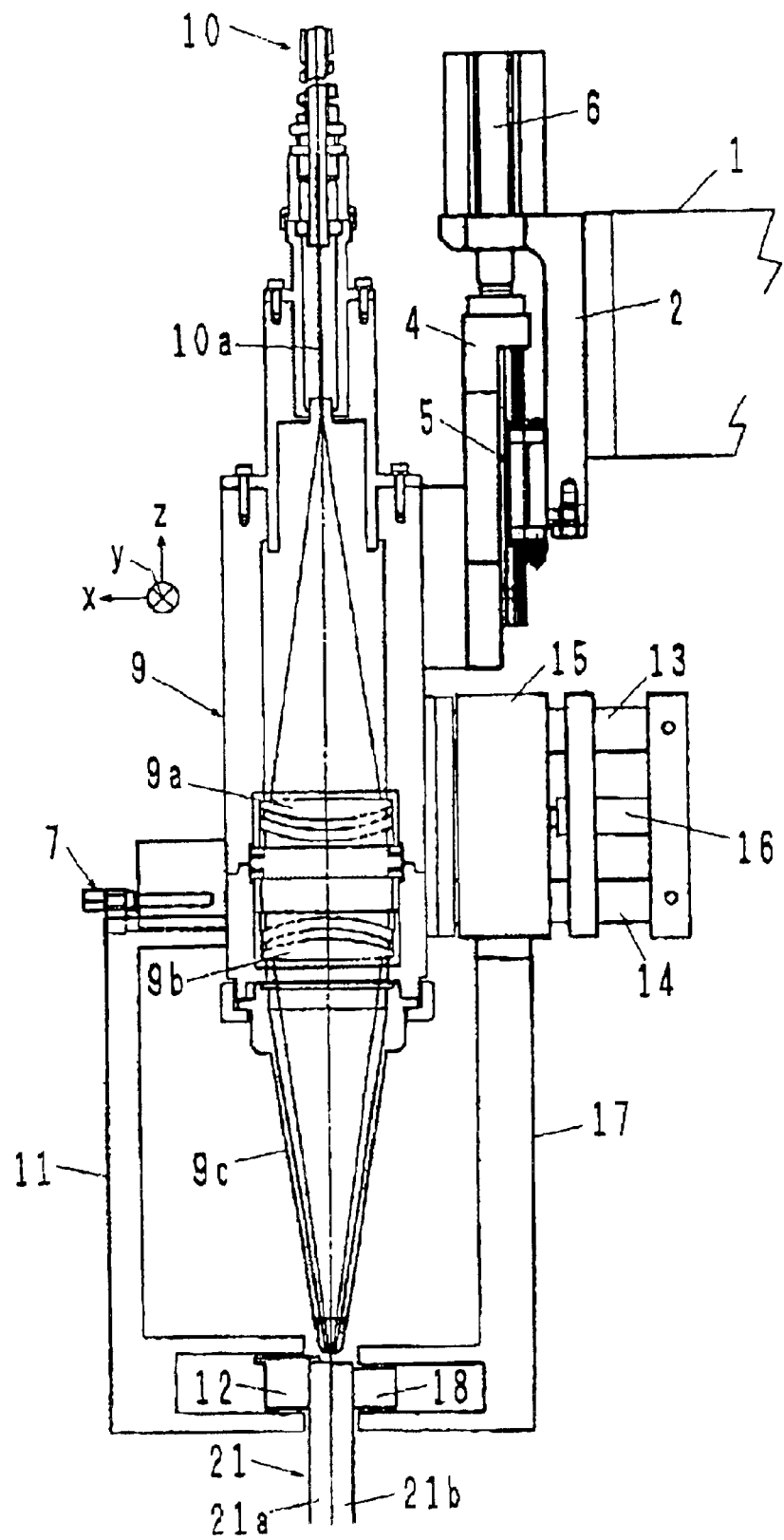
FIG. 1 is a vertical cross-sectional view of one embodiment of the present invention.

FIG. 1 shows one embodiment of the present invention. A base holder coupling frame 2 is provided on a supporting base holder 1, and a head holder 4 is supported on the base holder coupling frame 2 so as to be movable in a vertical direction z and immovable in horizontal directions x and y by means of a lifting guide 5. An air cylinder 6 is fixed on the base holder coupling frame 2, and a piston rod thereof is coupled with the head holder 4. When the air cylinder 6 pushes the piston rod, the head holder 4 descends, and when the piston rod is retracted, the head holder 4 ascends.

A YAG laser beam emitting head 9 is fixed on the head holder 4. A first member 11 is coupled with the YAG laser beam emitting head 9 via an emission x position adjustment mechanism 7. The bottom end of the first member 11 is bent from the z direction to the x direction to protrude close to a lower portion of a laser beam emitting nozzle of a conical nozzle body 9c of the head 9. A first set of flange-provided rollers 12 which has circumferential surfaces abutting an outer surface of a first plate material 21a of a layered base material 21 and flanges reaching on the upper end surface of the first plate material 21a is rotatably supported on the end portion of the first member 11 as its rotation shaft is parallel to the z axis. Regarding the first set of rollers 12, two rollers are juxtaposed in the y direction, and at the midpoints thereof the laser beam emitting nozzle of the nozzle body 9c is positioned.

Guide rods 13 and 14 extend parallel to the x axis from the YAG laser beam emitting head 9, and by means of these guide rods 13 and 14, a carriage 15 is slidably guided in the x direction. An air cylinder 16 is supported by the guide rods 13 and 14, and a piston rod thereof is coupled with the carriage 15. When the air cylinder 16 pushes the piston rod, the carriage 15 moves leftward on FIG. 1, and when the piston rod is retracted, the carriage 15 moves rightward.

The upper end of a second member 17 is fixed on the carriage 15. The bottom end of the second member 17 is bent from the z direction to the x direction to protrude close to the lower portion of the laser beam emitting nozzle of the nozzle body 9c. A second set of rollers 18 which has circumferential surfaces abutting an outer surface of a second plate material 21b of the layered base material 21 is rotatably supported on the end portion of the second member 17 as its rotation shaft is parallel to the z axis. Regarding the second set of rollers 18 also, two rollers are juxtaposed in the y direction, and at the midpoints thereof the laser beam emitting nozzle of the nozzle body 9e is positioned.

Figure 2:
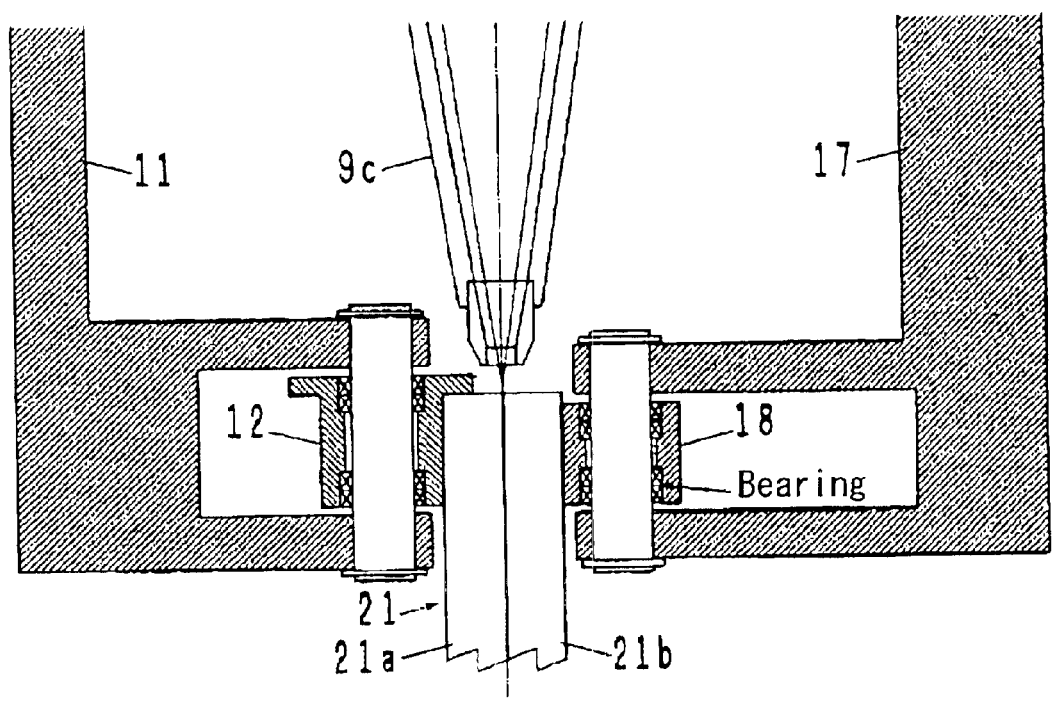
FIG. 2 is an enlarged vertical cross-sectional view of a first set of rollers 12 and a second set of rollers 18 shown in FIG. 1.

FIG. 2 shows a vertical cross-sectional view of the first set of rollers 12 and the second set of rollers 18 which sandwich and press the layered base material 21. When an adjustment screw of the emission x position adjustment mechanism 7 is turned clockwise, the first member 11 (rollers 12) supporting the first set of rollers 12 moves rightward on FIG. 1, whereby the layered base material 21 also moves rightward. When the adjustment screw of the emission x position adjustment mechanism 7 is turned counterclockwise, the layered base material 21 moves leftward. At this time, the x position of the laser beam emitting nozzle of the nozzle body 9c is immovable. Accordingly, by turning the adjustment screw of the emission x position adjustment mechanism 7, the laser beam emission x position on the end surface of the layered base material 21 can be adjusted. In conformity with the thickness of the first plate material 21a of the layered base material 21, the x position of the first set of rollers 12 is adjusted using the emission x position adjustment mechanism 7 so that the x position of the laser beam emitting nozzle of the nozzle body 9c matches the bonding line on the end surface of the layered base material 21.

YAG laser beam emitted by a YAG laser light source (not shown) is supplied to the YAG laser beam emitting head 9 by means of an optical fiber cable 10. The YAG laser beam emitted from an optical fiber 10a expands at a solid angle, converges through a lens 9a of an optical system to be substantially in parallel, and converges through a lens 9b of the convergence optical system so as to be a point outside of the laser beam emitting nozzle of the laser beam emitting head 9, so that a high density convergent YAG laser beam hits the bonding line portion of the end surface of the layered base material 21.

When edge joint welding is executed, the air cylinders 6 and 16 are both in low pressure connections where the piston rods are drawn, and the supporting base holder 1 (for example, a robot arm) is moved so that the edge of the layered base material 21 is placed between the rollers 12 and the rollers 18. At the same time the head 9 is moved to the x position where a circumferential surface of the base material 21 roughly touches the base material 21 and the z position where the end surface of the base material 21 is positioned at about a central position in the z direction of the circumferential surfaces of the rollers 12 and 18. Then, high pressure air is supplied to the air cylinder 16 so that the base material 21 is sandwiched by the rollers 12 and 18. High pressure air is supplied to the air cylinder 6 so that the lower surfaces of the upper flanges of the rollers 12 are pressed against the end surface of the base material 21. FIG. 1 shows the state where this is completed. A YAG laser beam is then emitted from the YAG laser beam emitting head 9.

The YAG laser beam radiation at the bonding line of the upper end surface of the base material 21 produces a fusion pool extending to the outside of the bonding line (the x direction), and the first plate material 21a and the second plate material 21b are welded at the end surface portion. By driving the head 9 in the y direction, or by driving the layered base material 21 in the y direction, edge welding can be continuously and linearly implemented. At this time since the rollers 12 and 18 rotate, movement resistance is small, and the lo layered base material 21 can be pressed by large forces. This pressing and sandwiching inhibits deformation in the respective first and second plate materials 21a and 21b. Furthermore, since the gap between the first and second plate materials 21a and 21b is eliminated, an edge weld joint which has been finely united and welded can be obtained.

What is claimed is:

1. A laser welding device comprising:
   a laser beam emitting head directed to a layered bonding position on an end surface in an edge of a layered base material;
   a first set of rollers for being along one plane of the layered base material;
   a second set of rollers for being along the other plane opposing the plane;
   a first member rotatably supporting the first set of rollers and being coupled with the laser beam emitting head;
   a second member rotatably supporting the second set of rollers and being coupled with the laser beam emitting head; and
   a pressing means for driving at least one of the first and second members in a direction in which the gap between the first set of rollers and the second set of rollers is reduced in order to sandwich and press the layered base material by means of the first set of rollers and the second set of rollers.

2. The laser welding device as set forth in claim 1 further comprising a skirting means for maintaining the distance between a laser beam emitting nozzle of the laser beam emitting head and the end surface in the edge of the layered base material at a constant value.

3. The laser welding device as set forth in claim 2, wherein the skirting means comprises a roller for being along the end surface in the edge of the layered base material and a skirting drive means for rotatably supporting the roller and driving a member coupled with the laser beam emitting head and the laser beam emitting head or a member coupled therewith in a direction in which the laser beam emitting nozzle of the laser beam emitting head approaches the end surface of the edge.

4. The laser welding device as set forth in claim 3, wherein the roller for being along the end surface of the edge is the first set of rollers.

5. The laser welding device as set forth in any one of claims 1 to 4 further comprising a mechanism for adjusting the position of the first member with respect to the laser beam emitting head in a direction of the thickness of the layered base material, wherein the second member is movable in the thickness direction of the layered base material with respect to the laser beam emitting head, and the pressing means drives the second member in the thickness direction.

6. A laser welding device comprising:
   a head holder movably supported in a z direction with respect to a base holder;
   a laser beam emitting head fixed on the head holder to emit a laser beam in the z direction;
   a first set of rollers having a circumferential surface opposing an outer surface of a layered base material positioned below a laser beam emitting nozzle of the laser beam emitting head and a flange opposing an end surface in an edge of the layered base material, the outer surface being parallel to the z direction;
   a second set of rollers having a circumferential surface opposing the other outer surface opposing the outer surface;
   a first member rotatably supporting the first set of rollers;
   an adjustment mechanism coupling the first member with the laser beam emitting head so that a position in a direction of the thickness of the layered base material is adjustable;
   a second member rotatably supporting the second set of rollers;
   a guiding mechanism supporting the second member on the laser beam emitting head so that the second member is reciprocatably supported in the thickness direction of the layered base material;
   a pressing means for driving the second member in a direction in which the circumferential surface of the second set of rollers approaches the circumferential surface of the first set of rollers; and
   a means for driving the head holder along the z direction with respect to the base holder so that the flange of the first set of rollers is along the end surface of the edge of the layered base material.

* * * * *